UNITED STATES PATENT OFFICE.

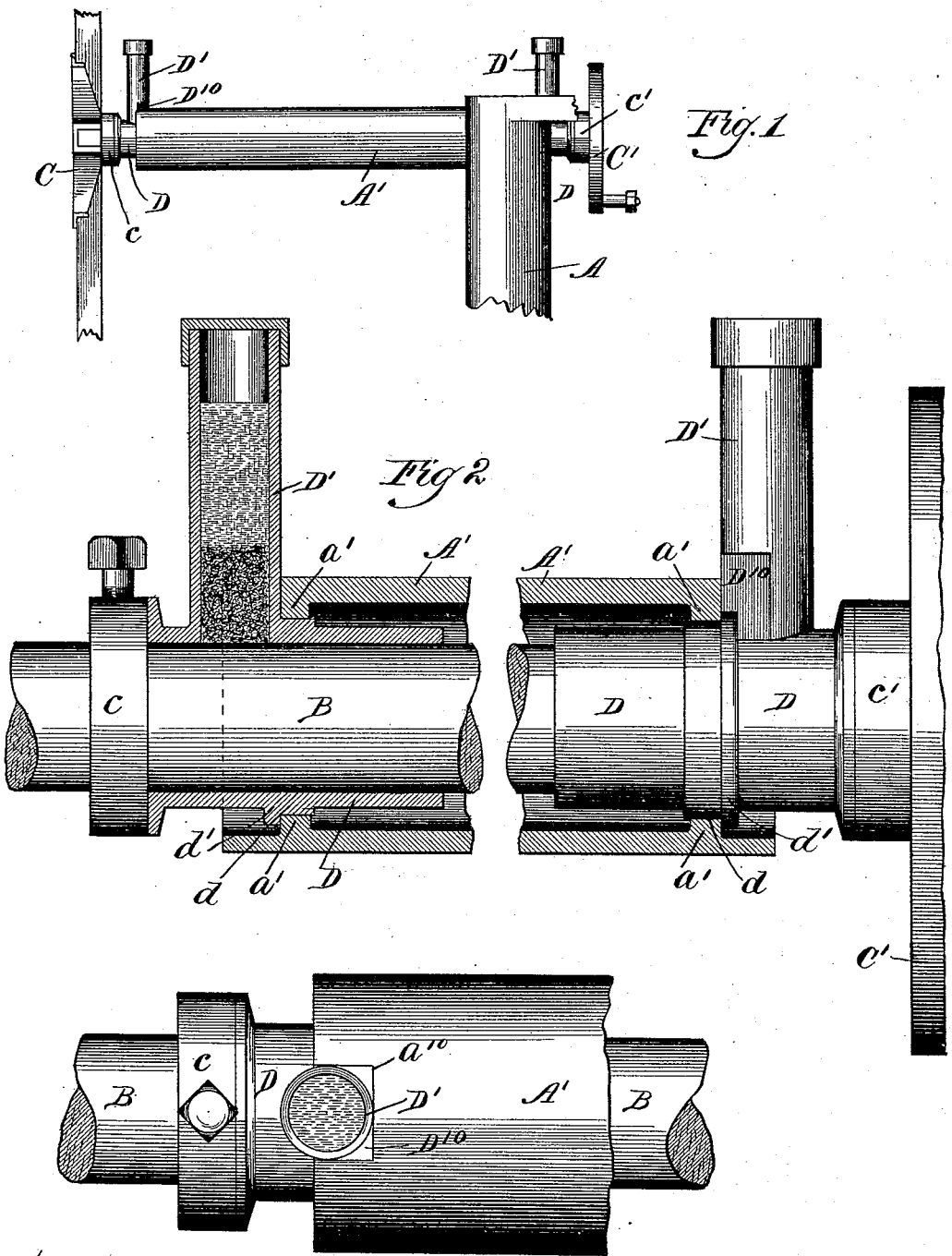

LA VERNE W. NOYES, OF CHICAGO, ILLINOIS.

SHAFT-BEARING FOR WINDMILLS.

SPECIFICATION forming part of Letters Patent No. 472,809, dated April 12, 1892.

Application filed November 30, 1891. Serial No. 413,476. (No model.)

*To all whom it may concern:*

Be it known that I, LA VERNE W. NOYES, a citizen of the United States, residing at Chicago, county of Cook, and State of Illinois, have invented certain new and useful Improvements in Shaft-Bearings for Windmills, which are fully set forth in the following specification, reference being had to the accompanying drawings, forming a part thereof.

In the drawings, Figure 1 is a side elevation of a portion of the frame having a horizontal arm, in which the windmill-shaft is journaled, showing, also, conventionally a portion of the windmill at the left hand and showing the crank-wheel at the right-hand end of said arm. Fig. 2 is a sectional detail, on an enlarged scale, of a windmill-shaft and its bearings, one of the bearings and the arm in which the bearings are mounted being shown in axial section. Fig. 3 is a detail plan of one end of the arm and the bearing therein and a portion of the shaft extending therethrough, showing the relation of the oil-cup to the arm as a check or stop to prevent the rotation of the bearing.

A is the frame in which the shaft is supported. A' is its horizontal arm, which constitutes the immediate support of the bearings of the shaft B, at one end of which is secured the windmill C and at the other end the crank-wheel C'.

D D are the shaft-bearings; D' D', oil-cups rigid with the shaft-bearings, respectively.

c represents either the hub of the windmill or a stop-collar on the shaft abutting against the outer end of the bearing. c' is in like manner either the hub of the crank-wheel C' or a collar on the shaft abutting against the outer end of the other bearing.

The arm A' is tubular and is provided with an interior annular boss or rib a' at a short distance from each end. The bearings D are provided each with an encircling boss or bead d, located at about the middle of the length of the bearing and of such diameter as to fit easily into the seat afforded by the interior annular boss a'. This encircling boss upon the bearing will be fitted to the interior boss in the arm as closely as a shaft would ordinarily be fitted to the bearing in which it is to revolve; but the bearing-surface between the two bosses being so narrow the bearing or box D will, notwithstanding such an approximately close fit, be capable of rocking slightly in the arm, so that the two bearings at the opposite ends of the arm will be automatically aligned by the shaft itself journaled in them, and thereby all necessity for expensive or difficult adjusting or adjustable devices for that purpose is removed. A stop bead or flange d' may be formed at the outer margin of the boss d, to prevent the box from sliding inward, and on the hub of the windmill at one end of the shaft and the hub of the crank-wheel at the other end, (or in lieu thereof stop-collars c and c', respectively,) to prevent the bearings from sliding outward. I prefer to provide each of these bearings with an oil-cup D', rigid with it, and I take advantage of this oil-cup as a stop to prevent rotation of the bearing in the arm. For this purpose a notch $a^{10}$ is made in the end of the arm at the upper side, and the oil-cup D' is located in such position on the bearing that when the latter is in its proper place, the boss d seated in the boss a', the oil-cup stands in this notch. Preferably the notch is rectangular, as illustrated, and the oil-cup, although cylindrical in general, has the square-cornered boss $D^{10}$ at the lower end in position to enter the rectangular notch $a^{10}$. Preferably the oil-cup is integral with the bearing, as illustrated; but its rigid connection thereto is all that is absolutely essential for the functions described. These bearings D, it will be observed, may be very cheaply constructed and readily and inexpensively replaced with new ones when they become worn. Being supported at the middle point of their length, so that the shaft has bearing for an equal distance each way from the point of support, which to the extent of any rocking movement which the bearing may have in order to become aligned with the shaft is a pivotal support, the entire length of the box is equally exposed to the pressure and wear of the shaft, so that its entire length is effective as a bearing-surface.

I claim—

1. In a windmill, the frame having a horizontal arm and the windmill-shaft extending therethrough, said horizontal arm having interior annular bosses a', combined with the shaft-bearings D, having exterior annular bosses $d$, adapted to seat within the bosses $a'$ and provided with flanges $d'$, which stop against the side of the bosses $a'$, and suitable stops on the shaft outside the bearings, respectively, to prevent endwise movement of the bearings with respect to the shaft, all substantially as and for the purpose set forth.

2. In a windmill, the frame having a horizontal arm and the windmill-shaft extending therethrough, said horizontal arm being provided with interior annular bosses $a'$, combined with the shaft-bearings D, having exterior annular bosses $d$, adapted to seat within the bosses $a'$, respectively, said bearings having rigid with them the oil-cups $D'$ and the arm having notches at the ends, which receive said oil-cups when the bearings are in place with their exterior bosses seated in the bosses $a'$, whereby said oil-cups serve as stops to prevent the rotation of the bearings in the arm, substantially as set forth.

In testimony whereof I have hereunto set my hand, in the presence of two witnesses, at Chicago, Illinois, this 25th day of November, 1891.

LA VERNE W. NOYES.

Witnesses:
JAMES H. COXE,
IVA J. GIFFEN.